United States Patent
Krishnamoorthy et al.

(10) Patent No.: US 11,288,080 B2
(45) Date of Patent: Mar. 29, 2022

(54) AFFECT-FOCUSED GAMIFIED PORTAL BUILDER

(71) Applicant: Bank of America Corporation, Charlotte, NC (US)

(72) Inventors: Madhusudhanan Krishnamoorthy, Chennai (IN); Ganesan Vijayan, Chennai (IN); Gurubaran Vt, Tiruvannamalai (IN)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 16/933,061

(22) Filed: Jul. 20, 2020

(65) Prior Publication Data

US 2022/0019448 A1   Jan. 20, 2022

(51) Int. Cl.
 *G06F 9/451*    (2018.01)
 *G06F 3/00*     (2006.01)
 *G06N 3/04*     (2006.01)

(52) U.S. Cl.
 CPC ............. *G06F 9/451* (2018.02); *G06F 3/005* (2013.01); *G06N 3/049* (2013.01); *G06N 3/0454* (2013.01)

(58) Field of Classification Search
 CPC ....... G06F 9/451; G06F 3/005; G06N 3/0454; G06N 3/049
 USPC ........................................................ 715/762
 See application file for complete search history.

(56) References Cited

U.S. PATENT DOCUMENTS

| 10,056,094 | B2 | 8/2018 | Feast et al. |
| 10,504,268 | B1* | 12/2019 | Huang ............... G06K 9/00302 |
| 10,609,165 | B1* | 3/2020 | Chauhan ................. H04L 67/22 |
| 2014/0063061 | A1* | 3/2014 | Reitan .................... G09G 3/003 345/633 |
| 2017/0193420 | A1 | 7/2017 | Tiwari |
| 2019/0236139 | A1* | 8/2019 | DeFelice ................. G06F 40/56 |
| 2019/0236148 | A1* | 8/2019 | DeFelice ............... G06F 40/216 |
| 2019/0297381 | A1* | 9/2019 | Chung ..................... G06N 3/08 |
| 2020/0151559 | A1* | 5/2020 | Karras .................. G06N 3/088 |
| 2020/0187841 | A1* | 6/2020 | Ayyad .................... A61B 5/377 |
| 2020/0327327 | A1* | 10/2020 | Wu ...................... G06F 16/5866 |
| 2021/0042503 | A1* | 2/2021 | Karras ..................... G06T 7/70 |
| 2021/0049468 | A1* | 2/2021 | Karras ................. G06N 3/0454 |
| 2021/0150150 | A1* | 5/2021 | Wu ........................ G06N 3/088 |
| 2021/0192800 | A1* | 6/2021 | Dutta .................... G06F 40/284 |

* cited by examiner

*Primary Examiner* — Andrew R Dyer
(74) *Attorney, Agent, or Firm* — Weiss & Arons LLP

(57) ABSTRACT

An adaptive gamified portal builder is provided. The portal builder may include a camera that captures video input and a microphone that captures audio input. The portal builder may identify affective features from the captured audio and video inputs. Using generative adversarial networks (GAN), the portal builder may generate a user interface (UI) output based on the affective features. Using a generator neural network, the portal builder may generate an image. Using a discriminator neural network, the portal builder may access a repository of gamified portal features associated with the cluster of affective vectors and validate the image. The portal builder may iterate through the generator network and the discriminator network to enhance the image. The portal builder may generate a UI image output comprising the enhanced image. Using a UI encoder, the portal builder may generate source code for the UI image output.

15 Claims, 4 Drawing Sheets

AFFECT-FOCUSED GAMIFIED PORTAL BUILDER

FIELD OF TECHNOLOGY

Aspects of the disclosure relate to using artificial neural networks to generate customized gamified portals.

BACKGROUND OF THE DISCLOSURE

Gamification is the application of game-design elements and game principles in non-game contexts. Game design elements are the basic building blocks of gamification applications. Illustrative game design elements include points, badges, leader-boards, performance graphs, meaningful stories, avatars, and teammates.

Gamification commonly employs game design elements to improve user engagement, organizational productivity, learning, employee recruitment and evaluation, and more. However, in an employment context, degree of engagement will vary among the pool of employees. It would be desirable to generate customized gamified portals targeted to different degrees of engagement.

SUMMARY OF THE DISCLOSURE

Systems, methods and apparatus may include an adaptive gamified portal builder.

The portal builder may include a camera that captures a video input from a user. The portal builder may include a microphone that captures an audio input from a user.

The portal builder may identify an affective feature from the captured audio and video inputs. The portal builder may generate one or more affective vectors corresponding to a user engagement level and store the affective vectors in association with a user identifier. The portal builder may cluster the one or more affective vectors into clusters based at least in part on the user engagement level.

Using a generative adversarial network (GAN), the portal builder may generate a user interface (UI) output. The portal builder may receive a cluster of affective vectors. The portal builder may receive one or more base portal features.

Using a generator neural network, the portal builder may generate an image, the image based at least in part on the affective vectors and the base portal features. Using a discriminator neural network, the portal builder may access a repository of gamified portal features associated with the cluster of affective vectors and validate the image.

The portal builder may iterate through the generator network and the discriminator network to enhance the image. The portal builder may generate a UI image output comprising the enhanced image. Using a UI encoder, the portal builder may generate source code for the UI image output.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
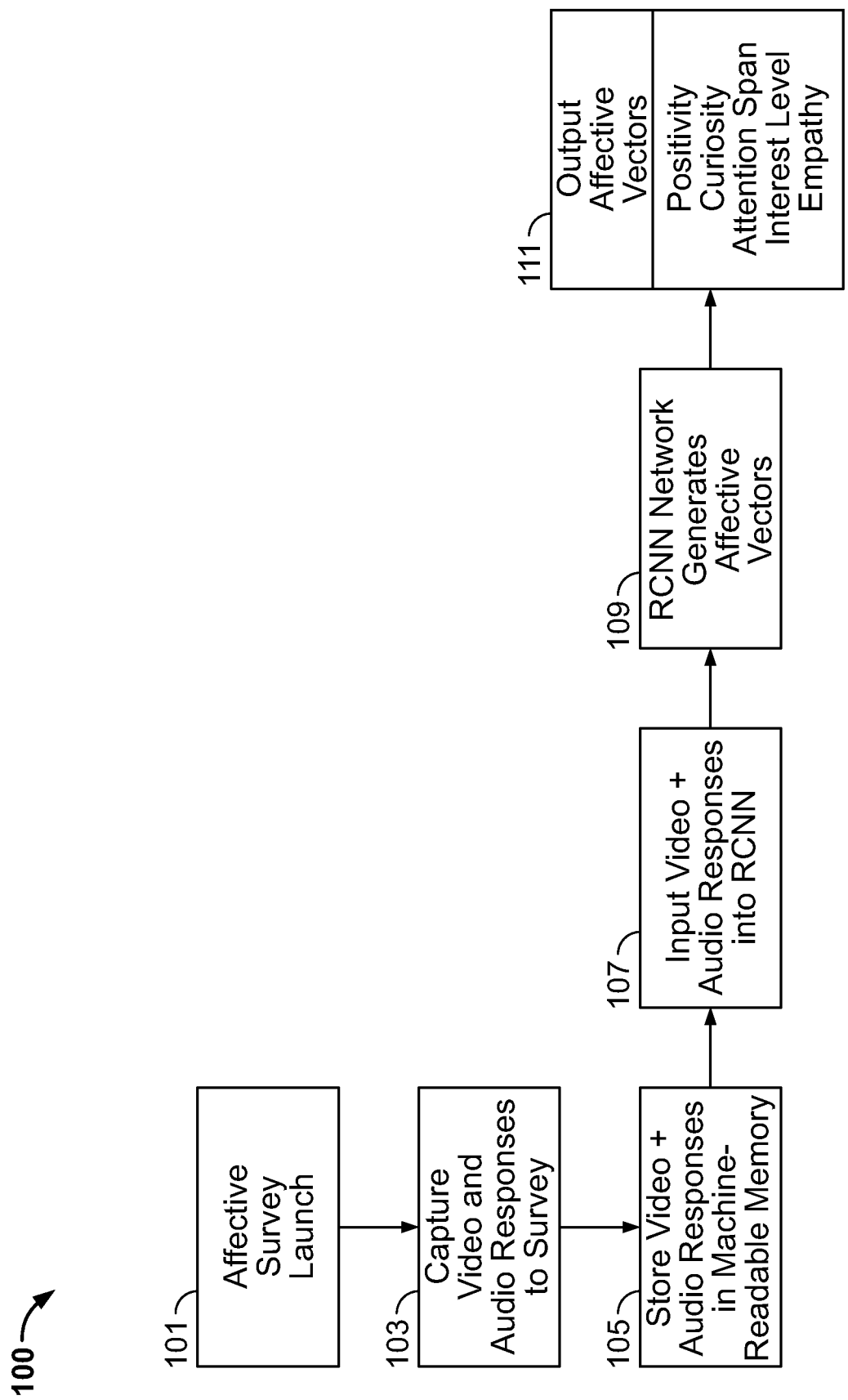
FIG. 1 shows an illustrative process flow in accordance with principles of the disclosure.

A system for building an affect-focused gamified portal is provided. The system may include a camera that captures video input from a user. The system may include a microphone that captures audio input from a user.

The system may include various hardware components. Such components may include a battery, a speaker, and antenna(s). The system may include machine readable memory. The machine-readable memory may store the video input and associate the video input with a specific survey respondent. The machine-readable memory may store the audio input and associate the audio input with a specific survey respondent.

The I/O module may include a microphone which may accept user provided input. The I/O module may include one or more of a speaker for providing audio output and a display for providing textual, audiovisual and/or graphical output.

Software may be stored within the non-transitory memory and/or other storage media. Software may provide instructions, that when executed by the microprocessor, enable the system to perform various functions. For example, software may include an operating system, application programs, web browser and a database.

Application programs, which may be used by the system, may include computer-executable instructions for invoking user functionality related to communication, authentication services, and voice input and speech recognition applications. Application programs may utilize one or more algorithms that encrypt information, process received executable instructions, interact with enterprise systems, perform power management routines or other suitable tasks.

The system may operate in a networked environment. The system may support establishing communication channels with one or more enterprise systems. The system may connect to a local area network ("LAN"), a wide area network ("WAN") a cellular network or any suitable communication network. When used in a LAN networking environment, the system may be connected to the LAN through a network interface or adapter. When used in a WAN networking environment, the system may include a modem or other means for establishing communications over a WAN, such as the Internet. It will be appreciated that the existence of any of various well-known protocols such as TCP/IP, Ethernet, FTP, HTTP and the like is presumed.

The system may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The system may utilize computer-executable instructions, such as program modules, being executed by a computer. Generally, program modules include routines, programs, objects, components, data structures, etc. that perform particular tasks or implement particular abstract data types. The system may be operational with distributed computing environments where tasks are performed by remote processing devices that are linked through a communications network. In a distributed computing environment, program modules may be located in both local and remote computer storage media including memory storage devices.

The system may detect emotional information using passive sensors that capture data about employee physical state or behavior. For example, the camera may capture facial expressions, body posture, and gestures, and the microphone may capture speech. In some embodiments, additional sensors may detect emotional cues by directly measuring physiological data, such as skin temperature and galvanic resistance.

The system may include a survey. The survey may include base-level gamification features. The survey may include questions designed to elicit affective responses from a respondent. The system may capture respondent facial expressions using a video camera. The system may capture respondent voice responses using an audio recorder The system may apply machine learning modalities such as speech recognition, natural language processing, or facial expression detection. The machine learning framework may include referencing one or more facial expression databases.

The system may use a multi-input machine learning framework. The machine learning framework may include a convolution neural network (CNN) that combines a joint feature extractor, classifier and regressor together in a unified framework. The CNN may be a recurrent convolution neural network (RCNN) that accounts for a temporal dimension in the captured responses in additional to the spatial dimensions.

The machine learning framework may be a hierarchical RCNN network in which a cluster of RCNNs are used to generate multiple outputs. The outputs may be a set of affective vectors. Each affective vector may measure one aspect of respondent engagement. Illustrative vectors include positivity, curiosity, attention span, interest level and empathy.

The sets of outputs may be grouped into categories. For example, a first set of vectors may be associated with a low degree of engagement, a second set of vectors may be associated with a medium degree of engagement, and a third set of vectors may be associated with a high degree of engagement. The system may apply clustering to group the outputs. The clustering may be deep adaptive clustering (DAC) using a pairwise binary classification framework, or any other suitable clustering method.

The system may cluster the one or more affective vectors into clusters based at least in part on the user engagement level. In some embodiments the system may generate a first cluster for a low level of engagement, a second cluster for a medium level of engagement, and a third cluster for a high level of engagement.

The system may incorporate affective features into a affect-focused gamified portal. The portal may be configured for employee training, business processes or any suitable purpose.

The system may use a generative adversarial network (GAN) to generate the gamified portal. The GAN may be a self-attention generative adversarial network (SAGAN). The self-attention mechanism may include attention-driven long-range dependency modeling for image generation. Attention functions may complement convolution operations and help the network capture fine details.

The GAN may generate a first layer user interface (UI). The GAN may receive a cluster of affective vectors. Conditional augmentation may be applied to the cluster of affective vectors. The GAN may use a first generator neural network to generate a first image based at least in part on the affective vectors.

The GAN may use a first discriminator neural network to validate the first image. The first discriminator network may access a repository of gamified portal features to validate the first image. The gamified portal features may be targeted to the engagement level associated with the cluster of affective vectors.

The system may iterate through the first generator network and the first discriminator network to enhance the first image. The system may generate a first layer UI output that includes the enhanced first image. In some embodiments the first enhanced image may have the dimensions 64×64×3 (height×width×channels).

A base portal skeleton may include business materials for incorporation into the portal. The base portal skeleton may include standardized portal design elements. The system may apply Mask RCNN for pixel-level image segmentation. Based on the base portal skeleton, the system may identify base portal features.

The GAN may generate a second layer UI. The GAN may receive the first layer UI output and a first base portal feature. The GAN may use a second generator neural network, to generate a second image based at least in part on the first layer UI output and the first base portal feature.

The GAN may use a second discriminator neural network to validate the second image. The second discriminator network may access the repository of gamified portal ideas to validate the second image.

The GAN may iterate through the second generator network and the second discriminator network to enhance the second image. The system may generate a second layer UI output that includes the enhanced second image. In some embodiments, the enhanced second image may have the dimensions 128×128×3 (height×width×channels).

The GAN may generate a third layer UI. The GAN may receive the second layer UI output and a second base portal feature. The GAN may use a third generator neural network, to generate a third image based at least in part on the second layer UI output and the second base portal feature.

The GAN may use a third discriminator neural network to validate the third image. The third discriminator neural network may access a repository of gamified portal ideas to validate the third image.

The GAN may iterate through the third generator network and the third discriminator network to enhance the third image. The system may generate a third layer UI output that includes the third enhanced image. In some embodiments the third enhanced image may have the dimensions 256×256×3 (height×width×channels).

Each GAN layer may include incremental feature enhancement using a combination of neural networks. A fully connected layer (FC), or dense network, may connect inputs from one layer to the activation unit of the next layer through conversion to a flat input. An upsampling layer may increase and enhance the dimension and quality of an image layer through transpose convolution or deconvolution. A residual layer may use residual neural networks to skip connections and avoid vanishing gradients that may hinder network learning.

Image enhancement techniques may include upsampling, expansion, interpolation, filtering with morphological operators histogram equalization, median filtering, unsharp mask filtering, contrast-limited adaptive histogram equalization (CLAHE), and decorrelation stretch.

The system may use a UI encoder to generate a functional portal compatible with front end hosting technologies. The UI encoder may receive the third layer UI and generate corresponding source code for the portal. The UI encoder may be a trained encoder network. The UI encoder may convert an image vector to corresponding HTML or CSS files, or to any suitable file format.

The system may run successively for each of the clusters of affective vectors and generates a portal geared toward a level of engagement. The system may run and generate a portal geared toward a low level of engagement. The system may run again and generate a portal geared toward a medium level of engagement. The system may run again and generate a portal geared toward a high level of engagement.

The system may store the affective vectors associated with a survey respondent in the machine-readable memory. The system can build a portal targeted to survey respondents based on their vector outputs.

A method for building an affect-focused gamified portal is provided. The method may be executed via computer-executable instructions run on a processor The method may include receiving captured video input from a camera.

The method may include receiving captured audio input from a microphone.

The method may include storing the video input and audio input in machine-readable memory.

The method may include identifying a plurality of affective features from the captured audio and video inputs.

The method may include generating a plurality of affective vectors corresponding to a user engagement level. In some embodiments the affective vectors may measure survey respondent engagement features comprising positivity, curiosity, attention span, interest level and empathy.

The method may include storing the affective vectors in the machine-readable memory in association with a user identifier.

The method may include clustering the affective vectors into clusters based at least in part on the user engagement level.

The method may include using a generative adversarial network (GAN). The GAN may be a self-attention generative adversarial network (SAGAN).

The method may include using the GAN to receive a cluster of affective vectors. The GAN may generate a first layer user interface (UI) based on the cluster of affective vectors.

The method may include using a first generator neural network to generate a first image based at least in part on the affective vectors.

The method may include using a first discriminator neural network to validate the first image. The first discriminator network may access a repository of gamified portal features to validate the first image.

The method may include iterating through the first generator network and the first discriminator network to enhance the first image. The method may include generating a first layer UI output including the enhanced first image. In some embodiments the dimensions of the enhanced first image are 64×64×3.

The method may include using the GAN to generate a second layer UI. The GAN may receive the first layer UI output and a first base portal feature. The GAN may use a second generator neural network to generate a second image based at least in part on the first layer UI output and the first base portal feature.

The method may include using a second discriminator neural network to validate the second image. The second discriminator network may access the repository of gamified portal features to validate the second image.

The method may include iterating through the second generator network and the second discriminator network to enhance the second image. The method may include generating a second layer UI output including the enhanced second image. In some embodiments the enhanced second image may have the dimensions 128×128×3.

The method may include using the GAN to generate a third layer UI. The GAN may receive the second layer UI output and a second base portal feature. The GAN may use a third generator neural network to generate a third image based at least in part on the second layer UI output and the second base portal feature.

The method may include using a third discriminator neural network to validate the third image. The third discriminator network may access the repository of gamified portal features to validate the third image.

The method may include iterating through the generator network and the discriminator network to enhance the third image. The method may include generating the third layer UI output including the third enhanced image. In some embodiments the third enhanced image may have the dimensions 256×256×3.

The method may include using a UI encoder to generate a functional portal compatible with front end hosting technologies. The UI encoder may receive the third layer UI and generate corresponding source code for the portal. The UI encoder may be a trained encoder network. The UI encoder may convert an image vector to corresponding HTML or CSS files, or to any suitable file format.

Systems, apparatus and methods described herein are illustrative. Systems, apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Systems and apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative process flow 100 for generating affective vectors. At step 101 a survey is launched. At step 103 survey video and audio responses are captured. At step 105 the video and audio responses are stored in machine readable memory. At step 107 the video and audio responses are entered into a convolution neural network (CNN). The CNN may be a recurrent convolution neural network (RCNN) that accounts for a temporal dimension in the captured responses in additional to the spatial dimensions.

At step 109 the RCNN generates the affective vectors. The RCCN may be hierarchical. The RCNN may combine multiple RCNNs for an output of multiple affective vectors. At step 11 the affective vector outputs quantify illustrative survey respondent engagement features including positivity, curiosity, attention span, interest level and empathy.

Figure 2:
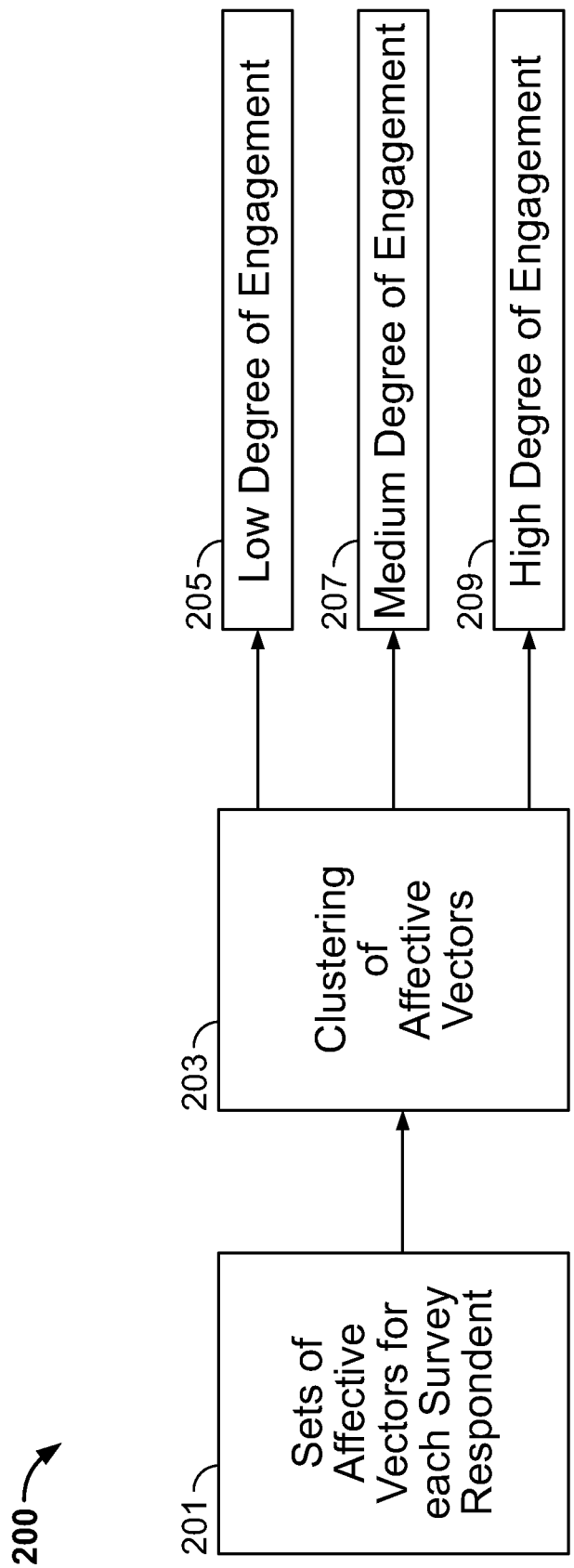
FIG. 2 shows an illustrative process flow in accordance with principles of the disclosure.

FIG. 2 shows illustrative process flow 200 for clustering affective vectors. The sets of affective vectors may be grouped into categories. The system may use machine learning algorithms to cluster the affective vectors. At step 203 the affective vectors are clustered. At step 205 a first cluster is associated with a low degree of engagement. At step 207 second cluster is associated with a medium degree of engagement. At step 209 a third cluster is associated with a high degree of engagement.

Figure 3:
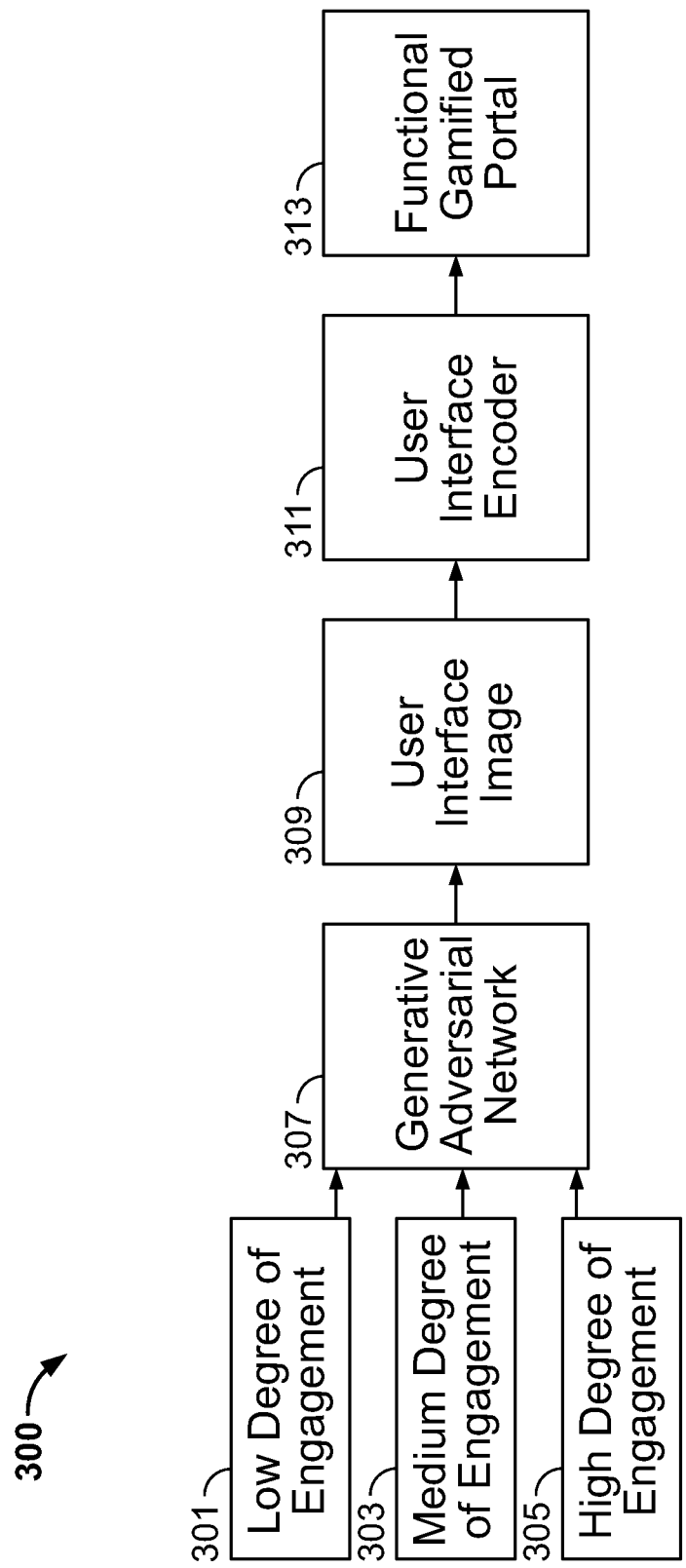
FIG. 3 shows an illustrative process flow in accordance with the principles of the disclosure.

FIG. 3 shows illustrative process flow 300 for generating a functional gamified portal. A cluster of affective vectors 301 is received by the generative adversarial network. Using generative adversarial network (GAN) 307, the system may generate user interface (UI) output 309. The UI output 309 is received by UI Encoder 311. UI Encoder 311 generates source code for Functional Gamified Portal 313.

Figure 4:
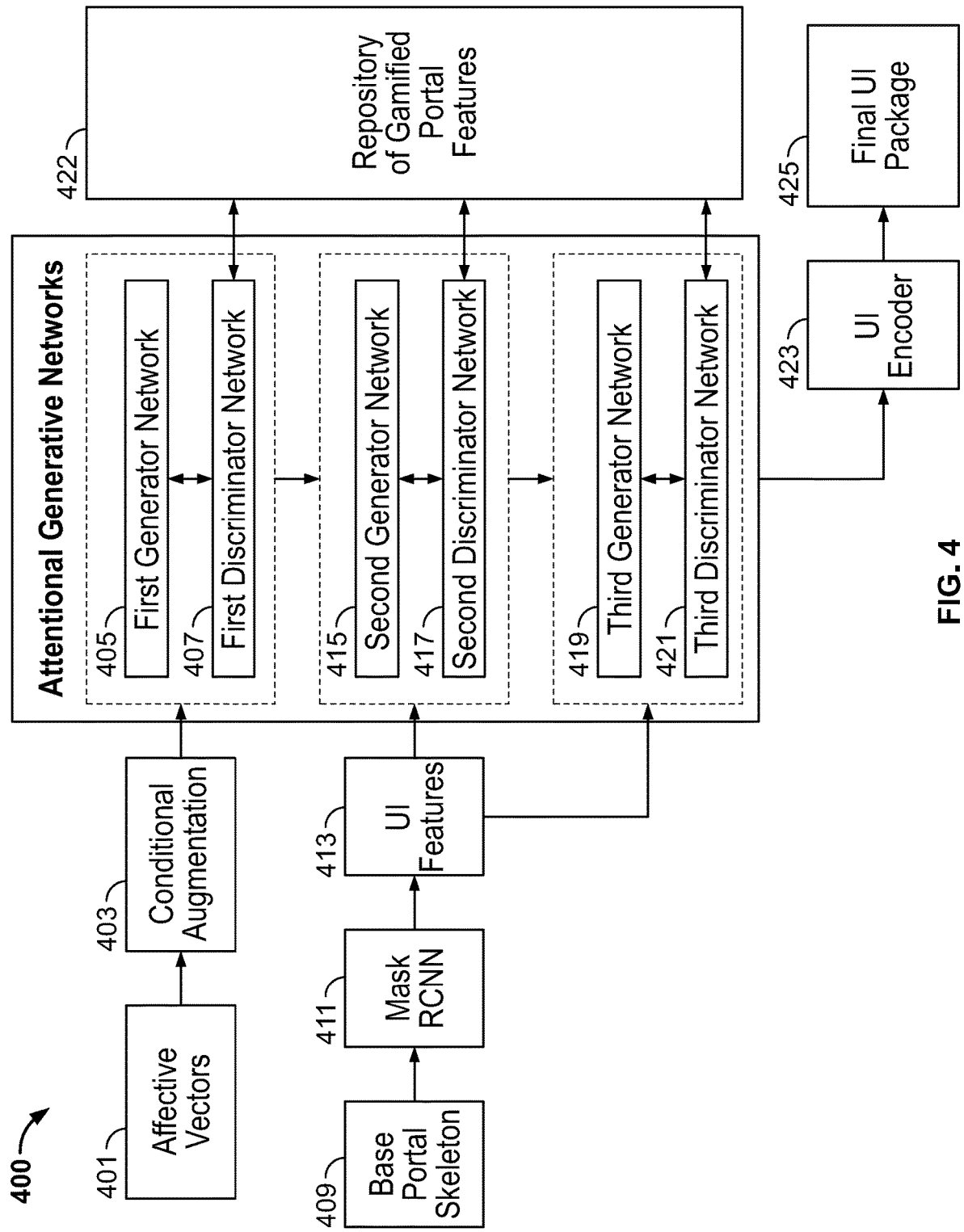
FIG. 4 shows a hybrid architecture/process flow in accordance with the principles of the disclosure.

FIG. 4 shows hybrid architecture/process flow for generating a final UI Package including source code. At step 403 Conditional Augmentation is applied to the affective vectors. The affective vectors are received by the first layer GAN. First generator network 405 generates a first image based at least in part on the affective vectors. First discriminator network 407, accesses repository of gamified portal features 422 and identifies features associated with the cluster of affective vectors. First discriminator network 407 validates the first image. The system iterates through the first generator network and the first discriminator network to enhance the first image. The GAN may output the enhanced first image.

At step 409 a base portal skeleton is received. The base portal skeleton may include business materials for incorporation into the final UI package. The base portal skeleton may include standardized UI design elements. At step 411 the system applies Mask RCNN to the base portal skeleton features. At step 413 the system identifies UI features.

Networks 415 and 417 are part of a second layer GAN. The first layer GAN output and the UI features are received by the second layer GAN. The second generator network 415 generates a second image based at least in part on the first layer GAN output and the UI features.

Second discriminator network 417 accesses repository of gamified portal features 422 and identifies additional features associated with the cluster of affective vectors. Second discriminator network 417 validates the second image. The system iterates through the second generator network 415 and the second discriminator network 417 to enhance the second image. The GAN may output the enhanced second image.

Networks 419 and 421 are part of a third layer GAN. The second layer GAN output and a second UI feature are received by the third layer GAN. The third generator network 419 generates a third image based at least in part on the second layer GAN output and the second UI feature.

Third discriminator network 421 accesses repository of gamified portal features 422 and identifies additional features associated with the cluster of affective vectors. Third discriminator network 421 validates the third image. The system iterates through the third generator network 421 and the third discriminator network 423 to enhance the third image. The GAN may output the enhanced third image.

The third layer GAN output is received by UI encoder 423. UI encoder 423 generates final UI package 425 including source code.

Thus, systems, methods, and apparatus for an AFFECT-FOCUSED GAMIFIED PORTAL BUILDER are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for building an affect-focused gamified portal, the method executed via computer-executable instructions run on a processor, the method comprising:
   receiving captured video input from a camera;
   receiving captured audio input from a microphone;
   storing the video input and audio input in machine-readable memory;
   identifying a plurality of affective features from the captured audio and video inputs;
   generating a plurality of affective vectors corresponding to a user engagement level;
   storing the affective vectors in the machine-readable memory in association with a user identifier;
   clustering the plurality of affective vectors into clusters based at least in part on the user engagement level;
   using a generative adversarial network (GAN), generating a first layer user interface (UI), the generating comprising:
      receiving a cluster of affective vectors;
      using a first generator neural network, generating a first image, the first image based at least in part on the affective vectors;
      using a first discriminator neural network, accessing a repository of gamified portal features associated with the cluster of affective vectors and validating the first image;
      iterating through the first generator network and the first discriminator network to enhance the first image; and
      generating a first layer UI output comprising the enhanced first image;
   using the GAN, generating a second layer UI, the generating comprising:
      receiving the first layer UI output and a first base portal feature;
      using a second generator neural network, generating a second image, the second image based at least in part on the first layer UI output and the first base portal feature;
      using a second discriminator neural network, accessing the repository of gamified portal features associated with the cluster of affective vectors and validating the second image using;
      iterating through the second generator network and the second discriminator network to enhance the second image; and
      generating a second layer UI output comprising the enhanced second image;
   using the GAN, generate a third layer UI, the generating comprising:
      receiving the second layer UI output and a second base portal feature;

using a third generator neural network, generating a third image, the third image based at least in part on the second layer UI output and the second base portal feature;
using a third discriminator neural network, accessing the repository of gamified portal features associated with the cluster of affective vectors and validating the third image;
iterating through the generator network and the discriminator network to enhance the third image; and
generating the third layer UI output comprising the third enhanced image; and
using a UI encoder, receiving the third layer UI output and generating corresponding source code for the portal.

2. The method of claim 1 wherein the affective vectors measure survey respondent engagement features comprising positivity, curiosity, attention span, interest level and empathy.

3. The method of claim 1, wherein the first image has the dimensions of 64×64×3, the second image has the dimensions of 128×128×3, and the third image has the dimensions of 256×256×3.

4. The method of claim 1 wherein the GAN is a self-attention generative adversarial network (SAGAN).

5. The method of claim 1, wherein the plurality of affective vectors is generated by a hierarchical recurrent convolution neural network (RCNN) in which a cluster of RCNNs are used to generate multiple outputs.

6. One or more non-transitory computer-readable media storing computer-executable instructions which, when executed by a processor on a computer system, perform a method for building an affect-focused gamified portal, the method comprising:
receiving captured video input from a camera;
receiving captured audio input from a microphone;
storing the video input and audio input in machine-readable memory;
identifying a plurality of affective features from the captured audio and video inputs;
generating a plurality of affective vectors corresponding to a user engagement level;
storing the affective vectors in the machine-readable memory in association with a user identifier;
clustering the plurality of affective vectors into clusters based at least in part on the user engagement level;
using a generative adversarial network (GAN), generating a first layer user interface (UI), the generating comprising:
receiving a cluster of affective vectors;
using a first generator neural network, generating a first image, the first image based at least in part on the affective vectors;
using a first discriminator neural network, accessing a repository of gamified portal features associated with the cluster of affective vectors and validating the first image;
iterating through the first generator network and the first discriminator network to enhance the first image; and
generating a first layer UI output comprising the enhanced first image;
using the GAN, generating a second layer UI, the generating comprising:
receiving the first layer UI output and a first base portal feature;
using a second generator neural network, generating a second image, the second image based at least in part on the first layer UI output and the first base portal feature;
using a second discriminator neural network, accessing the repository of gamified portal features associated with the cluster of affective vectors and validating the second image using;
iterating through the second generator network and the second discriminator network to enhance the second image; and
generating a second layer UI output comprising the enhanced second image;
using the GAN, generate a third layer UI, the generating comprising:
receiving the second layer UI output and a second base portal feature;
using a third generator neural network, generating a third image, the third image based at least in part on the second layer UI output and the second base portal feature;
using a third discriminator neural network, accessing the repository of gamified portal features associated with the cluster of affective vectors and validating the third image;
iterating through the generator network and the discriminator network to enhance the third image; and
generating the third layer UI output comprising the third enhanced image; and
using a UI encoder, receiving the third layer UI output and generating corresponding source code for the portal.

7. The media of claim 6 wherein the affective vectors measure survey respondent engagement features comprising positivity, curiosity, attention span, interest level and empathy.

8. The media of claim 6 wherein the first image has the dimensions of 64×64×3, the second image has the dimensions of 128×128×3, and the third image has the dimensions of 256×256×3.

9. The media of claim 6 wherein the GAN is a self-attention generative adversarial network (SAGAN).

10. The media of claim 6 wherein the plurality of affective vectors is generated by a hierarchical recurrent convolution neural network (RCNN) in which a cluster of RCNNs are used to generate multiple outputs.

11. A system for building an affect-focused gamified portal, the system comprising:
a camera, configured to capture a video input from a user;
a microphone, configured to capture an audio input from a user;
machine-readable memory configured to store the video input and the audio input; and
a processor configured to:
identify a plurality of affective features from the captured audio and video inputs;
generate, based on the plurality of affective features, a plurality of affective vectors corresponding to a user engagement level and store the affective vectors in the machine-readable memory in association with a user identifier;
cluster the set of affective vectors into clusters based at least in part on the user engagement level;
using a generative adversarial network (GAN), generate a first layer user interface (UI), the generating comprising:
receiving a cluster of affective vectors;

using a first generator neural network, generating a first image, the first image based at least in part on the affective vectors;

using a first discriminator neural network, accessing a repository of gamified portal features associated with the cluster of affective vectors and validating the first image;

iterating through the first generator network and the first discriminator network to enhance the first image; and generating a first layer UI output comprising the enhanced first image;

using the GAN, generate a second layer UI, the generating comprising:

receiving the first layer UI output and a first base portal feature;

using a second generator neural network, generating a second image, the second image based at least in part on the first layer UI output and the first base portal feature;

using a second discriminator neural network, accessing the repository of gamified portal features associated with the cluster of affective vectors and validating the second image;

iterating through the second generator network and the second discriminator network to enhance the second image; and generating a second layer UI output comprising the enhanced second image;

using the GAN, generate a third layer UI, the generating comprising:

receiving the second layer UI output and a second base portal feature;

using a third generator neural network, generating a third image, the third image based at least in part on the second layer UI output and the second base portal feature;

using a third discriminator neural network, accessing the repository of gamified portal features associated with the cluster of affective vectors and validating the third image;

iterating through the generator network and the discriminator network to enhance the third image; and generating the third layer UI output comprising the third enhanced image; and using a UI encoder, receive the third layer UI output and generate corresponding source code for the portal.

12. The system of claim 11, wherein the affective vectors quantify survey respondent engagement features comprising positivity, curiosity, attention span, interest level and empathy.

13. The system of claim 11 wherein the first image has the dimensions of 64×64×3, the second image has the dimensions of 128×128×3, and the third image has the dimensions of 256×256×3.

14. The system of claim 11 wherein the GAN is a self-attention generative adversarial network (SAGAN).

15. The system of claim 11, wherein the plurality of affective vectors is generated by a hierarchical recurrent convolution neural network (RCNN) in which a cluster of RCNNs are used to generate multiple outputs.

* * * * *